May 22, 1934.  N. M. MARSILIUS  1,959,435

MILLING MACHINE

Filed April 1, 1933  5 Sheets-Sheet 1

INVENTOR.
BY Newman M. Marsilius
ATTORNEY.
Christian M Newman

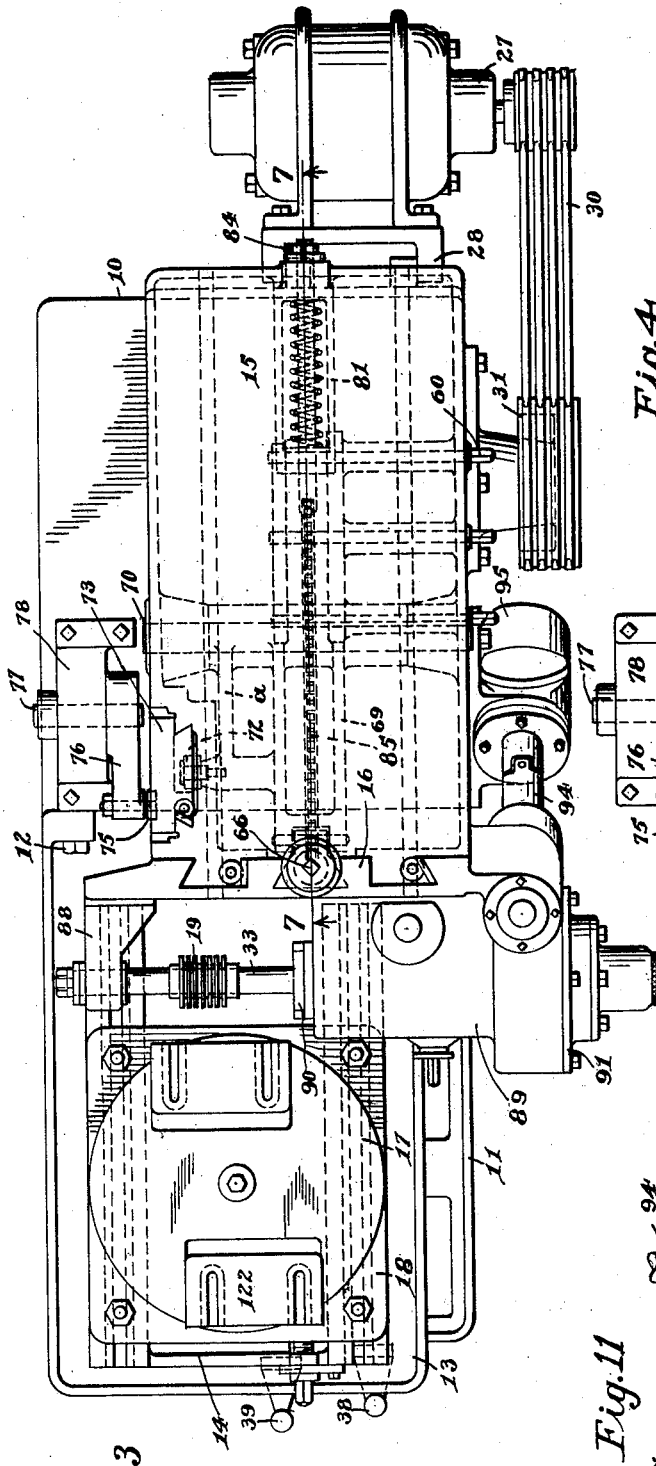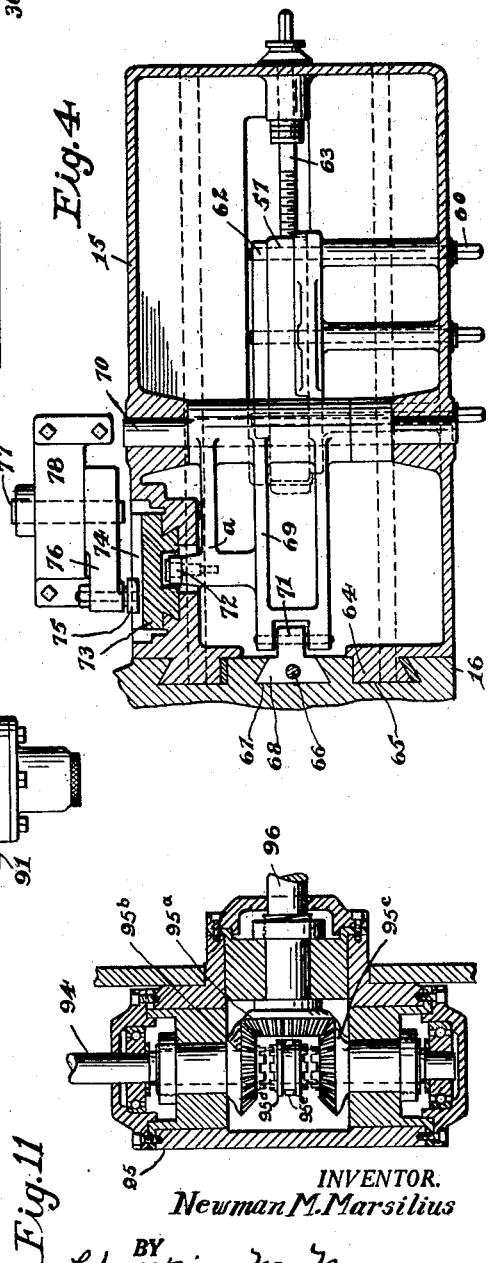
Fig.3  Fig.4  Fig.11
INVENTOR.
*Newman M. Marsilius*
BY
*Christian M. Newman*
ATTORNEY.

May 22, 1934.  N. M. MARSILIUS  1,959,435
MILLING MACHINE
Filed April 1, 1933   5 Sheets-Sheet 4
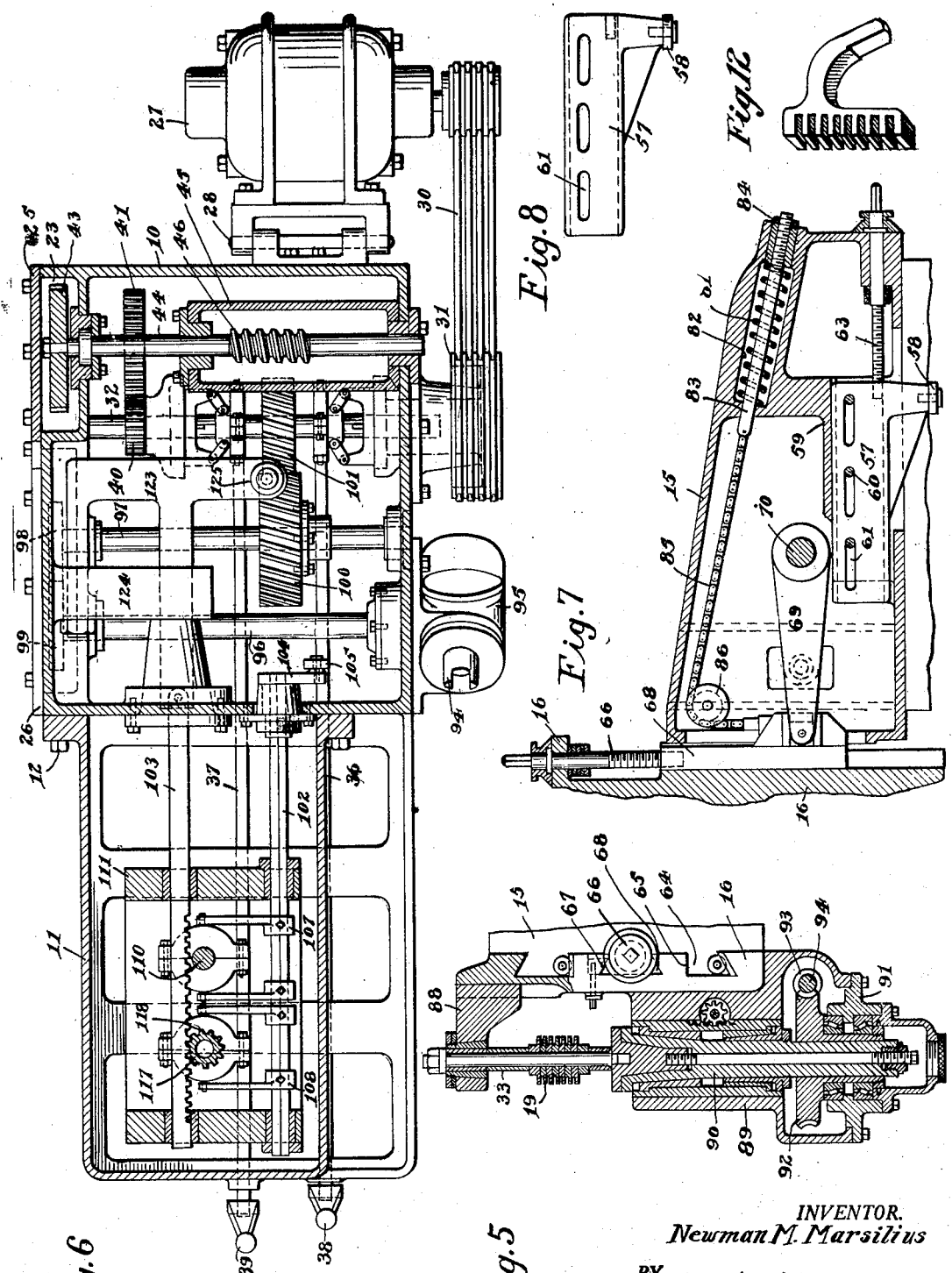
INVENTOR.
Newman M. Marsilius
BY
Christian M. Newman
ATTORNEY.

May 22, 1934.    N. M. MARSILIUS    1,959,435
MILLING MACHINE
Filed April 1, 1933    5 Sheets-Sheet 5

INVENTOR.
Newman M. Marsilius
BY
Christian M. Newman
ATTORNEY

Patented May 22, 1934

1,959,435

UNITED STATES PATENT OFFICE 1,959,435

MILLING MACHINE

Newman M. Marsilius, Bridgeport, Conn., assignor, by mesne assignments, to The Bridgeport Bronze Company, Bridgeport, Conn., a corporation of Connecticut Application April 1, 1933, Serial No. 663,878

8 Claims. (Cl. 90—15.1)

My present invention relates to milling machines and more particularly to improvements in gang-millers adapted for horizontal and vertical milling or any combination of the two, such as angular and circular cutting. The machine is especially adapted for slot milling, face milling, straddle milling and continuous milling.

The object of the invention is to provide an automatic milling machine adapted for a large variety of work by the use of a number of different forms of cutters to be removably and interchangeably mounted on a single arbor which is so arranged as to be moved into operative relation with work mounted upon a rotatable turret, while at the same time the operator is removing a finished piece of work from a holder of the turret and supplying it with a rough blank to be milled, it being understood that a certain limited amount of time is necessarily consumed in the return of the feeding movements of the cutters and the indexing of the turret.

The invention more particularly comprises improvements in the general design and construction of that type of machine shown and described in my United States Patent No. 1,895,333.

The invention further comprises the particular arrangement of parts and gears necessary to accomplish the foregoing purpose and to provide appropriate driving ratios and feed motions. The description hereunder given is to be regarded merely as an example of the manner in which the invention can be carried out, without thereby binding me to the specified details thereof.

The manner of carrying out the invention is illustrated in the accompanying drawings in which:

Fig. 3 is a top plan view of the machine as seen in Fig. 1;

Fig. 4 is a sectional plan view of the main slide, taken on line 4—4 of Fig. 1;

Fig. 5 shows a longitudinal sectional view of the cutter shaft and its driving gears, taken on line 5—5 of Fig. 1;

Fig. 6 is a horizontal section through the lower portion of the machine, taken on line 6—6 of Fig. 1;

Fig. 7 is a central vertical sectional view through the main slide and spindle carrier, taken on line 7—7 of Fig. 3;

Fig. 8 is a detached side elevation of the adjustable shoe employed in the main slide;

Fig. 11 shows a longitudinal sectional view, on a slightly enlarged scale, of the gear housing taken on line $x$ of Fig. 1, better to illustrate the reverse drive mechanism for the cutter shaft; and Fig. 12 shows a perspective view of a sample of work, a carrier rod bracket, having a series of slots therein such as my machine is adapted to cut.

Figure 9:
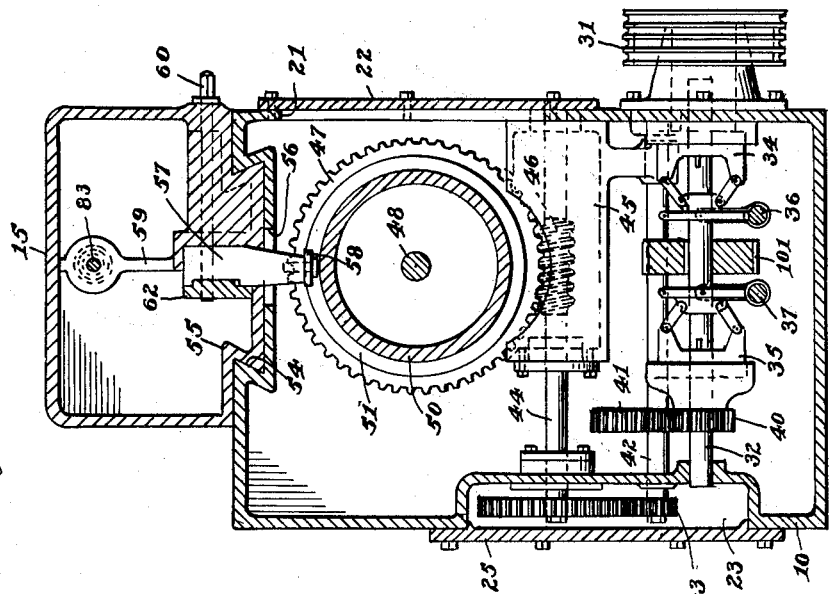
Fig. 9 is a vertical cross section taken on line 9—9 of Fig. 1, looking in the direction of the arrow.

Referring in detail to the character of reference marked upon the drawings, it will be seen that the machine includes a frame that is made up in part of a rear base member 10 and a forward base member 11 that is secured to the rear base member by means of screw bolts 12. This forward base member includes a dished top 13 upon which a bed 14 for a turret is adjustably mounted. The rear base member 10 serves in part to carry a reciprocatory slide 15 which in turn supports a vertically movable spindle carrier 16. The turret 17 is mounted on a base 18 that is adjustably mounted on the bed 14 and is adapted to be automatically indexed on said base to bring the work to be milled into alignment with the cutters 19, as will later be explained. Both base members 10 and 11 are hollow and serve to house mechanisms that form operative parts of the machine, as will later be described in detail. Suitable openings are provided in the sides of both base members whereby access may be had to the mechanism contained therein, as for instance referring to Fig. 2, it will be seen that the openings 20 are adjacent the indexing and lock mechanisms, and are adapted to be enclosed by an attachable plate, not shown. The openings 21 on opposite sides of the rear base member 10 are also adapted to be enclosed by plates, one of which 22 is shown in Fig. 9. In addition to the above mentioned openings, it will also be noted, see Fig. 2, that the change gear compartments 23 and 24 in the side of the base 10 are likewise adapted to be enclosed by plates 25 and 26, see Figs. 6 and 9.

The driving motor 27 for the machine is adjustably mounted upon the rear end of the base 10, there being a hinged connection 28 along the upper side and screw adjusting means 29 between the bottom of the motor frame and the end of the base and whereby the motor may be adjusted to and from the end of the base for the purpose of tightening its belts 30 that are connected to drive a pulley 31 upon a cross shaft 32 journaled in bearings of the base. This shaft comprises the main driving shaft and from it two branch driving connections are made, see Fig. 6, one for reciprocating the before mentioned cutter carrier 16 and the other for driving the cutter shaft 33, there being a sliding clutch 34 upon the shaft 32 for making and breaking the driving connection for the former, and a somewhat similar sliding clutch 35 upon the same shaft for controlling the operation of the cutter shaft. These clutches are operated through longitudinal rocker shafts 36 and 37 that are journaled in the base of the machine and extend out from the front end and are provided with operating handles 38 and 39 respectively, whereby the operator who is stationed at the front of the machine is able to control all operations, except that of the motor and the main driving shaft which are continuously driven, except of course when the switch for the motor is thrown off.

A relatively small gear 40 carried by the main driving shaft 32 meshes with and drives a comparatively larger gear 41 mounted upon a second cross shaft 42 that is also journaled in the sides of the base of the machine, and has one end extended into the compartment 23 and is provided therein with a change gear 43 that meshes with a second change gear within said compartment and secured to a worm shaft 44 mounted in a hollow adjustable bearing 45 hingedly secured to the shaft 42 and adjustably secured to the side of the base. The worm 46 carried upon this cross shaft 44 meshes with and drives a relatively large work gear 47 mounted upon a cam shaft 48 journaled in ball bearings enclosed in housings 49 in the opposite ends of the base 10. This longitudinal cam shaft carries a cam drum 50 having three cam grooves 51, 52 and 53, the former one of which serves to reciprocate the slide 15.

This slide is mounted to be reciprocated longitudinally on the top of the base 10 and is provided on its underside with dovetailed ways 54 to engage suitable longitudinal dovetailed guide ways 55 in the top of the base, there being an elongated opening 56 in said top portion of the base to accommodate a shoe 57 carrying a roller 58 that travels in the before mentioned cam groove 51. This shoe 57, see Figs. 7, 8 and 9, is adjustably secured in the slide by reason of it being formed with a relatively long body portion that is fitted against the side face of an upwardly extended rib 59 of the slide in which clamping screws 60 are loosely mounted and which extend through slots 61 of the upper or body portion of the shoe 57 and have their ends in threadable engagement with a plate 62, that serves as nuts for the said screw, and whereby the shoe after being adjusted by the adjusting screw 63 can be securely clamped in desired positions so that the slide will be correctly positioned longitudinally with respect to the base of the turret.

The forward end portion of the reciprocatory main slide 15 is provided with guide ways 64 to receive corresponding ways 65 of the vertically movable cutter carrier 16, the said cutter carrier being provided with an adjusting screw 66, see Fig. 7, whereby its vertical relation with respect to the slide is determined. The cutter carrier 16 is further provided with a central vertical dovetailed recess 67 to receive a vertically adjustable dovetailed insert 68 with which the lower threaded end portion of the adjusting screw 66 secured to the carrier is engaged, and whereby the said insert is adjustably fixed to the cutter carrier and includes a projected boss, see Fig. 4, through which an operative connection for the carrier is made.

This operative connection is for the purpose of imparting vertical reciprocatory movements to the cutter carrier and the cutters, as are necessary in the operation of the cutters, and as will be seen, includes an arm 69, one end of which is hingedly supported, see Figs. 4 and 7, on a fixed shaft 70 secured in the reciprocatory slide, and whose forward end is hingedly connected to a swivel block 71 carried by the insert 68. One side a of this arm 69 is built out and extends into an opening in the side of the reciprocatory slide, and carries a roller 72 that engages a suitable pocket in a slide 73 that is mounted for vertical reciprocatory movement in suitable dovetailed ways in the side of the reciprocatory slide 15. A cross groove 74 is formed in the outer face of this vertically movable slide 73 to receive a roller 75 carried by one arm 76 of a bell crank pivotally hung upon a stud 77 mounted in a bearing 78 secured to the base 10.

Figure 2:
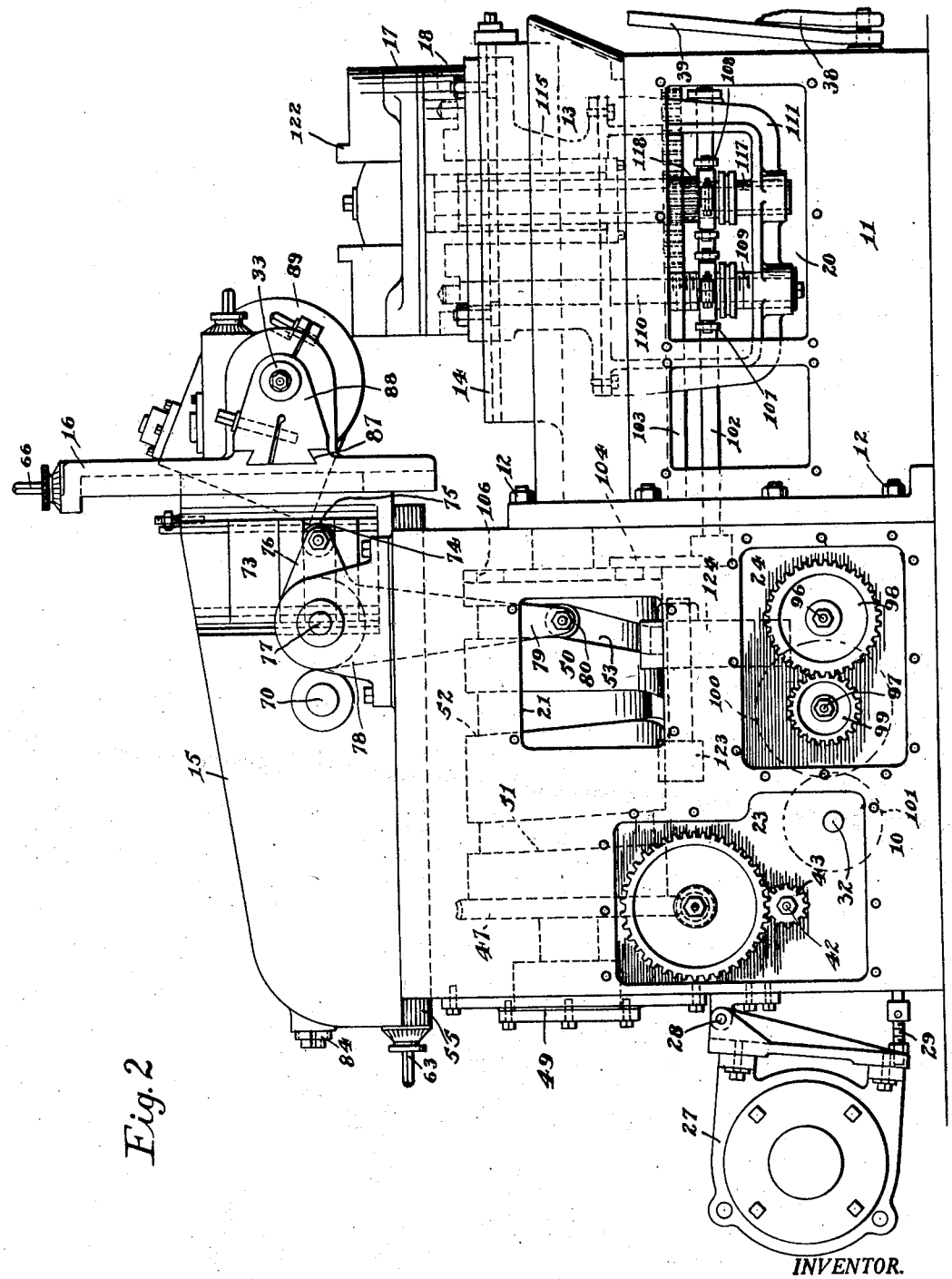
Fig. 2 is an elevation of the opposite side of the machine from that seen in Fig. 1, and having its five closure plates removed.

The other and longer arm 79 of this bell crank, see Fig. 2, extends down into the base 10 and carries a roller 80 that engages the cam groove 53 of the cam drum 50 mounted upon the longitudinal cam shaft 48. By this means, it will be seen that the cutter carrier is provided with suitable vertical reciprocatory operating means in addition to the horizontal reciprocatory movements imparted by the slide 15, as will again be referred to. Said cutter carrier operating means comprises primarily the bell crank, operated from the cam 53, and serves to raise and lower the slide 73 and its connected arm 69 within the slide and which in turn is connected to raise and lower the cutter carrier with the rocker movements of the bell crank.

The weight of the cutter carrier 16 is counterbalanced by a spring 81, see Fig. 7, contained within a pocket 82 in the reciprocatory slide 15, the spring being mounted upon a rod 83 one end of which is threadably engaged by a sleeve 84 threadably mounted in the slide 15. One end of a chain 85 is connected to the insert of the carrier, the intervening portion of the chain riding upon a roll 86 carried by the slide. By this means it will be seen that the weight of the carrier will be adjustably supported on the slide by adjusting the nut 84 referred to.

The cutter carrier is provided with suitable transverse dovetailed ways 87 to accommodate a bearing bracket 88 that supports one end of the cutter spindle 33. The carrier further includes a housing 89 in which the driving spindle 90 for the cutter shaft is mounted, said spindle being in alignment with the cutter shaft and together with its bearings and gearing is enclosed within said housing by a cover 91. A worm gear 92 is mounted on this driving spindle 90 and is connected with and operated by a worm 93 carried upon one member of a flexible shaft 94 that is in turn connected with gearing, again to be referred to, in housing 95 secured to the side of the rear base member 10, and connected to be driven by a cross shaft 96 journaled in the base. This shaft 96 is driven from the cross shaft 97, that is also journaled in the machine, and is connected to drive the said shaft 96 through change gears 98 and 99 within the compartment 24, one of the said gears being mounted upon the outer end of the shaft 96 and the other on the end of the other shaft 97. This shaft 97 is driven from the main driving shaft 32 through gear connections 100 and 101, the latter being mounted upon the said main driving shaft 32.

Figure 1:
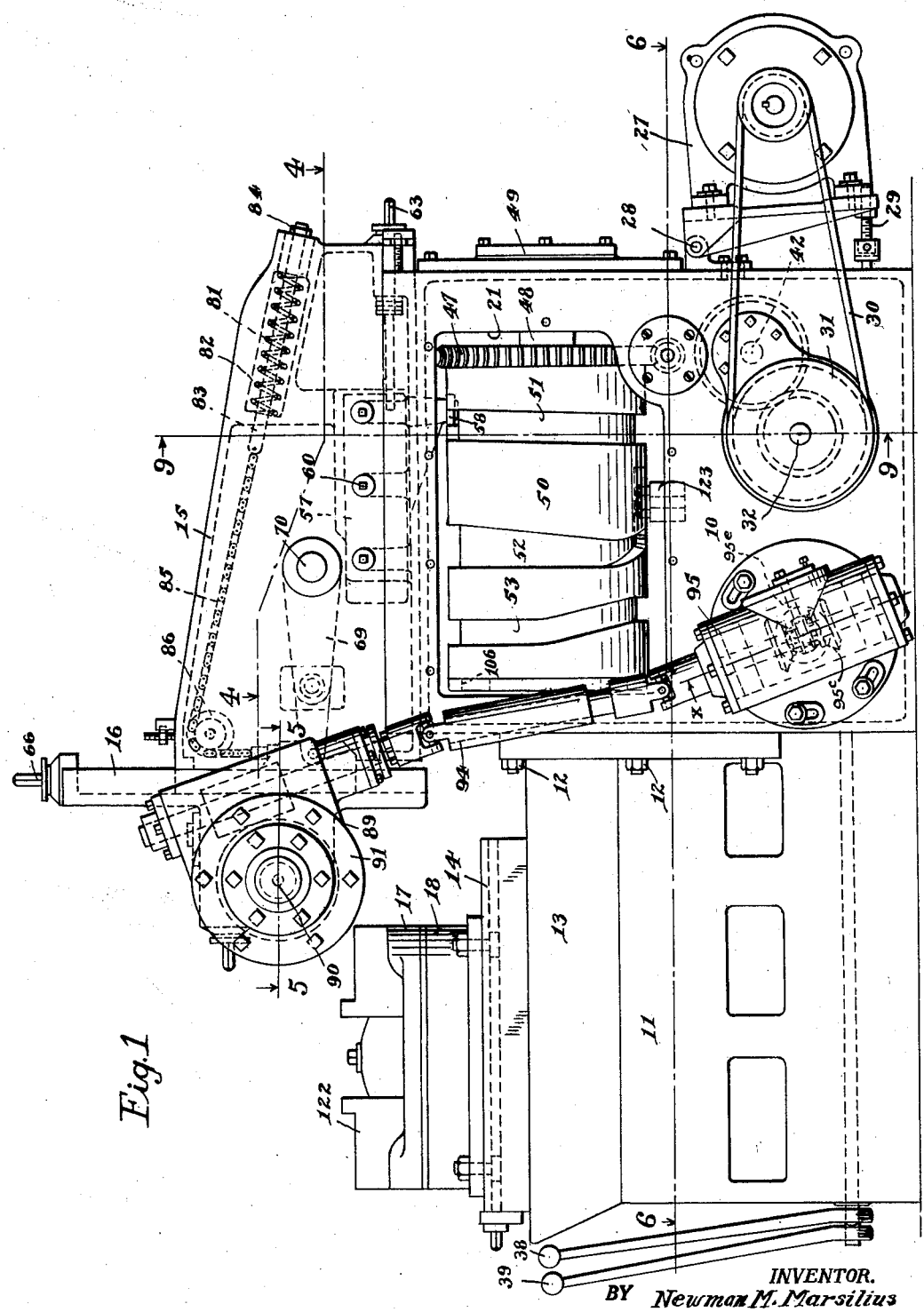
Fig. 1 shows a side elevation of my improved milling machine, a closure plate being removed from one side, better to illustrate a relatively large cam drum.

Referring specifically to the gearing within the gear box 95, see Figs. 1 and 11, it will be noted that provision is made for driving the cutter shaft 90 in either a forward or backward direction by the employment of a bevelled gear 95ª that is mounted on the enclosed end of shaft 96 and loose clutch gears 95ᵇ and 95ᶜ upon the lower section within the housing 95 of the flexible shaft 94. A slidable clutch member 95ᵈ is mounted upon this shaft 94 between the clutch faces of the two said bevelled gears 95ᵇ and 95ᶜ, so as to engage the clutch face of either of these gears, or if desired to occupy a neutral position. This clutch member is connected to be operated by an arm 95ᵉ upon the outside of the housing, see Fig. 1, by means of which the clutch which is obviously splined to its shaft can be engaged with either of the gears 95ᵇ or 95ᶜ in a way to drive the shaft upon which they are mounted in a clockwise or counter-clockwise direction. This obviously will drive the cutter shaft either forward or backward, and inasmuch as the cutters are detachably and reversibly mounted upon the said shaft, the cutters or others of different sizes may be mounted to run in either direction.

Figure 10:
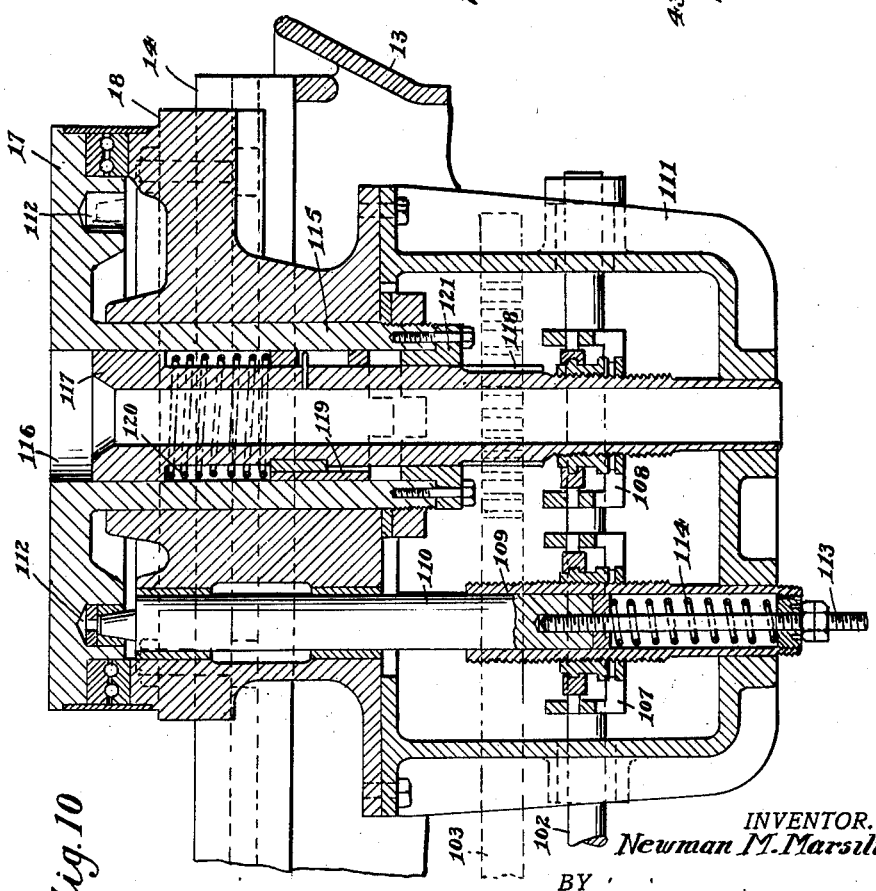
Fig. 10 shows an enlarged central vertical section through the rotatable work table, illustrating the indexing and locking mechanism.

Referring to Figs. 6 and 10, it will be seen that the indexing and locking means for the turret 17 are operated through a rocker shaft 102 and the slide rack 103, said shaft being rocked through an arm 104 bearing a roller 105 that engages a cam groove 106 in the cam drum 50. The forward end of this rocker shaft is provided with two pairs of arms 107 and 108, the former of which through its adjustable connection with the threaded sleeve 109 serves to raise and lower the lock pin 110. The upper end of this sleeve is slidably mounted on the lock pin while the lower portion is slidably mounted in a hanger 111 secured to the underside of the bed 14. The lock pin is mounted to slide in the base 18 and is adapted to engage suitable sockets 112 in the underside of the turret 17.

A yieldable operating connection is provided between the sleeve 109 and the lock pin 110 by means of a rod 113, one end of which is threadably connected to the lock pin 110 and the other end extended freely through the lower end of the sleeve 109, there being a compression spring 114 positioned in the sleeve around the rod with one end against the rock pin and the other against the closed end of the sleeve so that a yieldable upward pressure will be provided for the lock pin, better to permit the top end of the lock pin to engage the sockets 111 of the turret. This turret includes a hollow hub portion 115 that is journaled in a bore of the bed in a way to permit the turret to be turned for indexing. This hub portion is provided with a central longitudinal bore 116 to accommodate clutch operating mechanism, as will again be referred to.

The forked arm 108 operates similar to the arm 107, and serves to raise and lower an elongated rotatable sleeve 117 that is also slidably mounted in the central bore 116 of the turret. Annular gear teeth 118 are formed on a portion of the peripheral surface of the sleeve, for engagement by the slide rack 103. A tubular clutch member 119 is keyed for limited longitudinal sliding movement in the sleeve 117, there being a spring 120 positioned on the sleeve between its top end and the tubular clutch member so that with a downward pull on the sleeve 117 the clutch member 119 will be drawn down to yieldably engage the lower clutch member 121 secured to the lower end of the hub of the turret. By this means, it will be seen that rotary movement may be imparted to the turret by the rack, and gear at such times as when the sleeve 117 is drawn down to engage the two clutch faces. The movement of the rack is limited by the throw of the cam that operates it, and consequently the turret is given uniform rotary movements for the respective indexing operations.

From the foregoing, it will be seen that the lock plunger is pulled out simultaneously with the engagement of the clutch members carried by the turret operating member and the clutch member carried by the turret so that the engagement of the turret operating member with the turret is effected at the same instance that the turret is unlocked and becomes free to rotate. The turret is rotated by rack 103 which is reciprocated by a cam 106 timed to produce a preliminary slow rotary movement of the turret that is immediately accelerated and finally decelerated, preparatory to the stopping and locking. This slow starting, rapid turning, and slow stopping serves to produce a smooth and quietly operating turret, and one wherein the locking and unlocking mechanism is scarcely detectable.

Referring to Fig. 3, it will be noted that the turret 17 is provided with but two chucks or fixtures 122, each of which is adapted to support a piece of work, as for instance like that shown in Fig. 12. One of these fixtures or holders, as shown in this view, is positioned adjacent to the cutters 19 upon the cutter spindle 33 so that the cutters will properly engage the work as the cutter carrier is fed forward and downward through the work piece, to produce the series of cuts or slots required. The other fixture is oppositely located on the top side of the turret adjacent the front end of the machine, in position for the attendant to release a finished article and replace it with a rough blank to be milled during the milling operation of the work piece adjacent the cutters.

This necessarily means that the turret must be indexed a half rotation with each operation so as to bring the rough piece of work to be milled from the front to the rear side of the turret, and to bring the finished piece from the rear to the front side. This rotary movement of the turret is effected through the operation of the rack 103 and its engagement with the gear teeth upon the hub of the turret, and the amount of the rotation, whether it be a half or a quarter turn, is determined by the length of the movement of the rack; therefore it is within the positive range of the machine to have the turret moved for either quarter or half indexing, as occasion may require. If quarter indexing is necessary, two additional fixtures would be required upon the turret.

Having described the mechanism of my milling machine, I will now briefly describe its operation, whereby the several parts function to cause the turret to index and the cutters to be moved to and from the work to be milled. In this respect, it will be noted that the several parts of the machine are operated from a single source, namely the electric motor designated as 27. From this, power is imparted to a clutch-faced pulley 31 and which serves to operate the driving shaft 32 through a clutch member 34. A gear 101 keyed to the shaft is thus driven and power communicated to the intermediate shaft 97. The clutch member 35 is also slidably keyed to the driving shaft 32 and serves to form, when engaged, a driving connection from said driving shaft to the clutch-faced gear 40 that is normally loose upon the shaft, but which, when engaged, serves to drive gear 41 on a cross shaft 42. This last mentioned shaft, through change gears 43 and worm shaft 44, serves to operate the worm gear and drum upon the longitudinal shaft 48. This drum serves to reciprocate the cutter slide longitudinally of the machine, and also through a second cam groove, serves to move the cutter carrier vertically so that both horizontal and vertical movements are imparted to the cutters with respect to the work mounted upon the turret.

The turret is indexed by the cam groove 52 of the cam drum through a slidable member 123, see Fig. 6, that is mounted for slidable movement in a bracket 124, and carries a roller 125 for engagement with said cam 52, the forward end of this slidable member being connected to the slidable rack 103 that is in engagement with the gear on the hub of the turret. This cam drum, through its cam groove 106 and its connection with the rocker shaft 102, serves to engage and release the lock pin for the turret and thus serves to engage and release the same at proper intervals and in coordination with the indexing movements.

The cutters and their shaft carried in the cutter carrier are operated through the worm and gear connection with the flexible shaft 94 and the cross shaft 96 that is driven through the change speed gearing connected with the cross shaft 97.

Having thus described my invention, what I claim and desire to secure by Letters Patent is:

1. In a milling machine, a base, a work holder, a reciprocatory slide mounted on the base, a cutter carrier slidably mounted in the slide, an insert mounted in the carrier, means for adjusting the insert with respect to the carrier, an arm hingedly mounted in the slide, having one end hingedly connected to the insert for reciprocating the carrier, a cam, a bell crank lever mounted in the base having one arm connected with the cam and the other arm connected to operate the arm.

2. In a milling machine, a base, a driving shaft in the base, a reciprocatory slide mounted on the base, a carrier mounted for vertical movement in one end portion of the slide, a counterbalancing spring contained within the slide, connections therefrom to the carrier whereby the same can be easily raised and lowered, means for adjusting said spring to regulate the tension, a cam for reciprocating the slide, and a shoe adjustably mounted in the slide for engagement with the cam groove to move the slide with respect to the base.

3. In a milling machine, a base, a driving shaft mounted therein, a reciprocatory slide mounted on the base, a cutter carrier movably mounted in the slide, a cutter shaft and cutters mounted in the carrier, connections from the driving shaft for operating the cutter shaft, a cam drum operated by the driving shaft, a shoe carried by the slide and engaging a groove of the cam drum whereby the slide is moved forward and backward on the base, a bell crank lever mounted in the base having one arm connected with a groove of the cam drum and the other arm connected to reciprocate the carrier.

4. In a milling machine, a base, a reciprocatory slide mounted thereon, a cutter carrier supported by the slide, a cutter shaft and cutters mounted on the carrier, an indexable work-carrying turret, a cam drum, connections with the drum for indexing the work-carrying turret, means operated by the cam drum for locking the work-carrying turret, driving connections for operating the cutter shaft, a shoe carried by the slide and engaging a groove of the cam drum whereby the slide is moved forward and backward, a bell crank lever mounted on the base with one arm connected to be operated by the cam drum and the other arm connected to operate the carrier during the reciprocatory movements of the slide.

5. In a milling machine, a base, a reciprocatory slide mounted thereon, a cutter carrier movably supported in the slide, a cutter shaft and cutters mounted on the carrier, a driving shaft, driving connections therefrom for reciprocating the slide, connections from the driving shaft for operating the cutter shaft, a cam drum mounted in the base for reciprocating the slide including a shoe carried by the slide and engaging a groove of the cam drum whereby the slide is moved forward and backward, a bell crank lever mounted on the base having one arm connected with and operated by a cam groove of the cam drum, and the other slidably connected to operate the vertically movable carrier during the reciprocatory movements of the slide.

6. In a milling machine, a base, a driving shaft mounted therein, a reciprocatory slide mounted on the base, a cutter carrier movably mounted in the slide, a cutter shaft and cutters mounted in the carrier, connections from the driving shaft for operating the cutter shaft, a cam drum operated by the driving shaft, a shoe carried by the slide and engaging a groove of the cam drum whereby the slide is moved forward and backward on the base, a swinging arm mounted in the slide and connected to reciprocate the carrier, a vertically movable slide block mounted in the reciprocatory slide and connected to raise and lower the arm, a bell crank lever mounted on the base having one arm connected with a groove of the cam drum and the other arm connected with the slide block to reciprocate the carrier.

7. In a machine tool, the combination with a bed, of a turret mounted to rotate thereon having a central hole therethrough and a series of pockets, a clutch member carried by the turret, a turret operating member rotatably and slidably mounted within said central hole of the turret, a clutch member carried by the rotatable and slidable operating member to engage the before mentioned clutch member of the turret, a rack for rotating the operating member, a locking plunger disposed parallel to the rotatable operating member to engage the pockets of the turret, a single horizontal shaft connected to simultaneously rotate and slide both the rotating operating member and the locking member, and a cam means to operate the rack and shaft whereby the turret is first unlocked and then engaged and rotated a predetermined distance.

8. In a machine tool, the combination with a bed, of a turret mounted to rotate thereon, a cylindrical turret operating member rotatably and slidably mounted within the turret and having a gear toothed face, a rack engaging said teeth for rotating the operating member, a vertically disposed locking plunger to engage the turret, a single shaft disposed at a right angle to simultaneously operate both the rotating operating member and the locking member, and a cam means to operate the rack and shaft whereby the turret is first unlocked and then engaged and rotated a predetermined distance.

NEWMAN M. MARSILIUS.